UNITED STATES PATENT OFFICE.

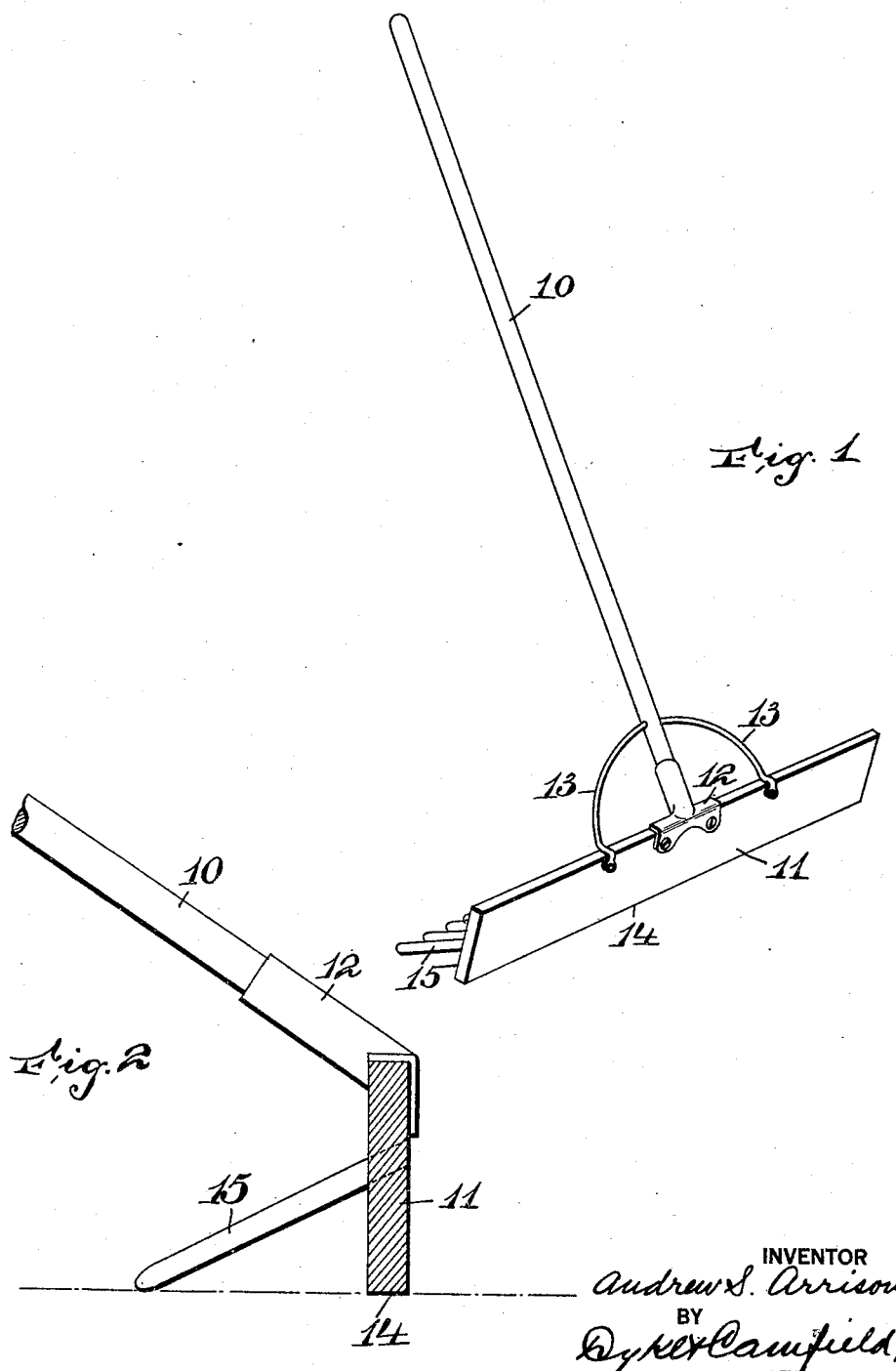

ANDREW S. ARRISON, OF JERSEY CITY, NEW JERSEY.

RAKE.

1,200,690.   Specification of Letters Patent.   Patented Oct. 10, 1916.

Application filed August 11, 1915. Serial No. 44,954.

*To all whom it may concern:*

Be it known that I, ANDREW S. ARRISON, a citizen of the United States, and a resident of Jersey City, county of Hudson, and State of New Jersey, have invented certain new and useful Improvements in Rakes, of which the following is a specification.

This invention relates to a rake which is adapted to be used to clean a lawn or other place so that even small pieces will be gathered, and it is not made necessary to go over spots repeatedly to gather up all the leaves, grass, or the like.

The invention is further designed to provide a rake that will not injure the turf but which prevents tearing or scratching the ground, while at the same time it insures all loose material being gathered.

The invention is illustrated in the accompanying drawing, in which—

Figure 1 is a perspective view of one form of my improved rake, and Fig. 2 is an enlarged section of the rake with the handle shown in elevation and broken away at its upper end.

The form of rake shown has a handle or stale 10 which is attached at its bottom end to a combined guide and head 11. The means of fastening the head to the handle is not essential, but in the drawing I show a socket 12 secured to the head, in which socket the handle 10 is placed. To insure additional stability I may employ bows 13 which are attached to the handle and to the head, to the latter at points removed from the socket. The head 11 can be of different forms and materials, the head illustrated being a flat wooden head, wood being a good material as it is light and slides easily over the surface of the ground or lawn. The bottom edge 14 is smooth and unbroken so that there are no protuberances to enter the ground and no recesses to permit the passage of material. The bottom edge 14 can be any shape in cross-section, but it is illustrated as being flat. The head is usually placed at such an angle to the handle as to cause the head or guard to be substantially vertical when the handle is at an operative or usual angle. The teeth 15 are secured in advance of the head 11 and are preferably attached directly to the head to save space and diminish the number of parts. The teeth 15 are usually placed at an angle so that they project forwardly and downwardly so that they pass easily under material to be gathered. The teeth shown are of the ordinary wooden type, but other forms and materials may be used. The teeth diverge in their relation to the handle so that a pull on the handle draws the teeth along the ground.

In my form of rake the guard slides easily over the ground or grass without tearing or gouging any part of it and acts to limit the depression of the teeth, the guard supporting the rake so that the teeth can only be forced into the ground when the handle is held at an unusual or uncomfortable angle. The guard or head follows the teeth and collects such particles as may pass between the teeth, and these particles are gathered by the teeth at the next stroke of the rake.

With my rake, closely cut lawns, moist lawns or ground, in fact any locality or condition, can be raked without any injury to the turf by the teeth of the rake.

The rake is simple and light, can be economically manufactured and consists of but few parts. It is handled like an ordinary rake and is comfortably operated.

Having thus described my invention, I claim:

A rake comprising a substantially erect head with a straight bottom edge, teeth secured to said head at a substantial distance above the bottom edge and projecting downwardly and forwardly with their ends substantially level with the bottom edge of the head, and a handle secured to said head and at such an angle thereto that the handle is in operative position when the head is substantially vertical.

In testimony that I claim the foregoing, I hereto set my hand, this 10th day of August, 1915.

ANDREW S. ARRISON.